(12) United States Patent
Ackley et al.

(10) Patent No.: US 10,238,976 B2
(45) Date of Patent: Mar. 26, 2019

(54) LOCATION-BASED EXPERIENCE WITH INTERACTIVE MERCHANDISE

(71) Applicant: DISNEY ENTERPRISES, INC., Burbank, CA (US)

(72) Inventors: Jonathan Ackley, Glendale, CA (US); Christopher J. Purvis, Estacada, OR (US); Scott Frazier Watson, Marina Del Ray, CA (US); Mark A. Reichow, Glendale, CA (US); Kyle Prestenback, Miami Springs, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 182 days.

(21) Appl. No.: 15/204,862

(22) Filed: Jul. 7, 2016

(65) Prior Publication Data

US 2018/0008897 A1    Jan. 11, 2018

(51) Int. Cl.
*A63F 9/24* (2006.01)
*A63F 13/837* (2014.01)
*A63F 13/211* (2014.01)
*A63F 13/426* (2014.01)
*A63F 13/428* (2014.01)
*A63F 13/245* (2014.01)
(Continued)

(52) U.S. Cl.
CPC .......... *A63F 13/837* (2014.09); *A63F 13/211* (2014.09); *A63F 13/213* (2014.09); *A63F 13/235* (2014.09); *A63F 13/245* (2014.09); *A63F 13/27* (2014.09); *A63F 13/426* (2014.09); *A63F 13/428* (2014.09)

(58) Field of Classification Search
None
See application file for complete search history.

(56) References Cited

U.S. PATENT DOCUMENTS

2011/0085705 A1* 4/2011 Izadi .................. G06K 9/00369
                                              382/103
2015/0286275 A1* 10/2015 Huang .................... G06F 3/011
                                              345/156
(Continued)

OTHER PUBLICATIONS

Extended European Search Report for European Patent Application No. 17162562.7, dated Oct. 17, 2017.

*Primary Examiner* — Paul A D'Agostino
(74) *Attorney, Agent, or Firm* — Robert G. Crouch; Marsh Fischmann & Breyfogle LLP

(57) ABSTRACT

A system for providing an interactive experience for multiple game-players. The experience is provided in a light-controlled setting where the game-players may wear or hold one or more of various toys (e.g., gloves). The system detects and recognizes the toy along with gestures and pointing efforts performed by the game-player and the system generates an effect based on the type of toy and the type of gesture. The system also generates one or more visual targets that are visible to the game-player such as projections, holograms, and displays of one or more of various fantasy virtual adversaries. The generated effects may include any combination of sensory effects including visual, audio, tactile, and smell/taste. The generated effect may be directed based on the pointing efforts of the game-player. The system may then register the effect on the target, if the pointing efforts intersect with the virtual location of the target.

10 Claims, 12 Drawing Sheets

(51) Int. Cl.
    *A63F 13/213*     (2014.01)
    *A63F 13/235*     (2014.01)
    *A63F 13/27*     (2014.01)

(56) References Cited

U.S. PATENT DOCUMENTS

2015/0346835 A1   12/2015   Bell et al.
2016/0030836 A1    2/2016   Barney et al.
2016/0139243 A1    5/2016   Send et al.

\* cited by examiner

LOCATION-BASED EXPERIENCE WITH INTERACTIVE MERCHANDISE

BACKGROUND

In recent years, interactive games and experiences have been developed for amusement parks to increase the engagement and enjoyment of park visitors. One example is Disney's Sorcerers of the Magic Kingdom, which uses card recognition mechanics in a theme park-based interactive game/experience.

Another example is Disney's Kim Possible World Showcase Adventure, which featured interactive game/experience installations triggered through inputs from mobile devices (phones) carried by participants.

Another example is a hand-held object with a retro-reflector thereon (and which is otherwise passive (not containing any electronics)) that allows a system at amusement parks to track movements of the object and determine gestures the user makes with the object. The system can then cause certain special effects to occur based on the gesture. Such systems are very limited in the number of simultaneous users that can play and in the number and types of special effects that can be created.

It is against this background that the techniques described herein have been developed.

SUMMARY

Disclosed herein is a system for providing an interactive game experience. The system includes a defined game-player zone in which one or more game-players may participate in the interactive game experience; a defined theatrical zone in which one or more images are produced, each image being produced at a real or virtual position; one or more sensors positioned to detect the presence of one or more predefined toys associated with each game-player, determine a toy type for each toy, recognize gestures made by each game-player, and determine the position and pointing direction of each game-player. The system generates an effect from at least one of the game-players based on the toy type of the toy associated with that game-player and based on the gesture made by that game-player. The effect is directed along a direction determined by the position and pointing direction of that game player.

The system may determine if the direction the effect is directed along intersects with the real or virtual position of the image, and if so the image is changed to reflect the influence of the effect thereon. One or more sensors may uniquely identify each game-player so that historical data can be maintained on each game-player and the effect generated by that game-player can be enhanced based on the historical data. One of the predefined toys may include gloves. One of the predefined toys may include a hand covering. One of the predefined toys may be carried with the hand of the game-player. One of the predefined toys may include clothing worn by the game-player. One of the predefined toys may include headwear worn by the game-player. One of the predefined toys may include a mobile telecommunication and computing device.

The effect may include a visual effect. The one or more sensors may include a different sensor for each of: detecting the presence of the toys associated with each game-player and determining the toy type for each toy; recognizing gestures made by each game-player; and determining the position and pointing direction of each game-player. The sensor that detects the presence of the toys associated with each game-player and determines the toy type for each toy may include RFID technology. The sensor that determines the position and pointing direction of each game-player may include LIDAR technology.

Also disclosed herein in a method for providing an interactive game experience, including: detecting a game-player and associated toy; displaying a virtual adversary target; determining the type of toy associated with the game-player; determining a predefined gesture performed by the game-player; determining a pointing vector created by pointing efforts of the game-player; displaying a visual effect along the pointing vector, the effect being correlated to the toy type and the predefined gesture; determining if the pointing vector intersects with the target; and if the pointing vector does intersect, displaying a resulting effect on the target.

If the pointing vector does not intersect, the process flow may return to determining a predefined gesture performed by the game-player.

Also disclosed herein is a method for providing an interactive game experience, including: detecting the presence of a human with a LIDAR tracking system; alerting the human of the opportunity to participate in the interactive game experience; and accepting the human into the interactive game experience.

Also disclosed herein is a method for providing an interactive game experience, including: providing a sensor located at a first location; with the sensor, sensing a three-dimensional position of an object located at a second location that is spaced apart from the first location; based upon the sensed three-dimensional position of the object, determining the position of the object relative to a target plane.

DETAILED DESCRIPTION

Figure 1:
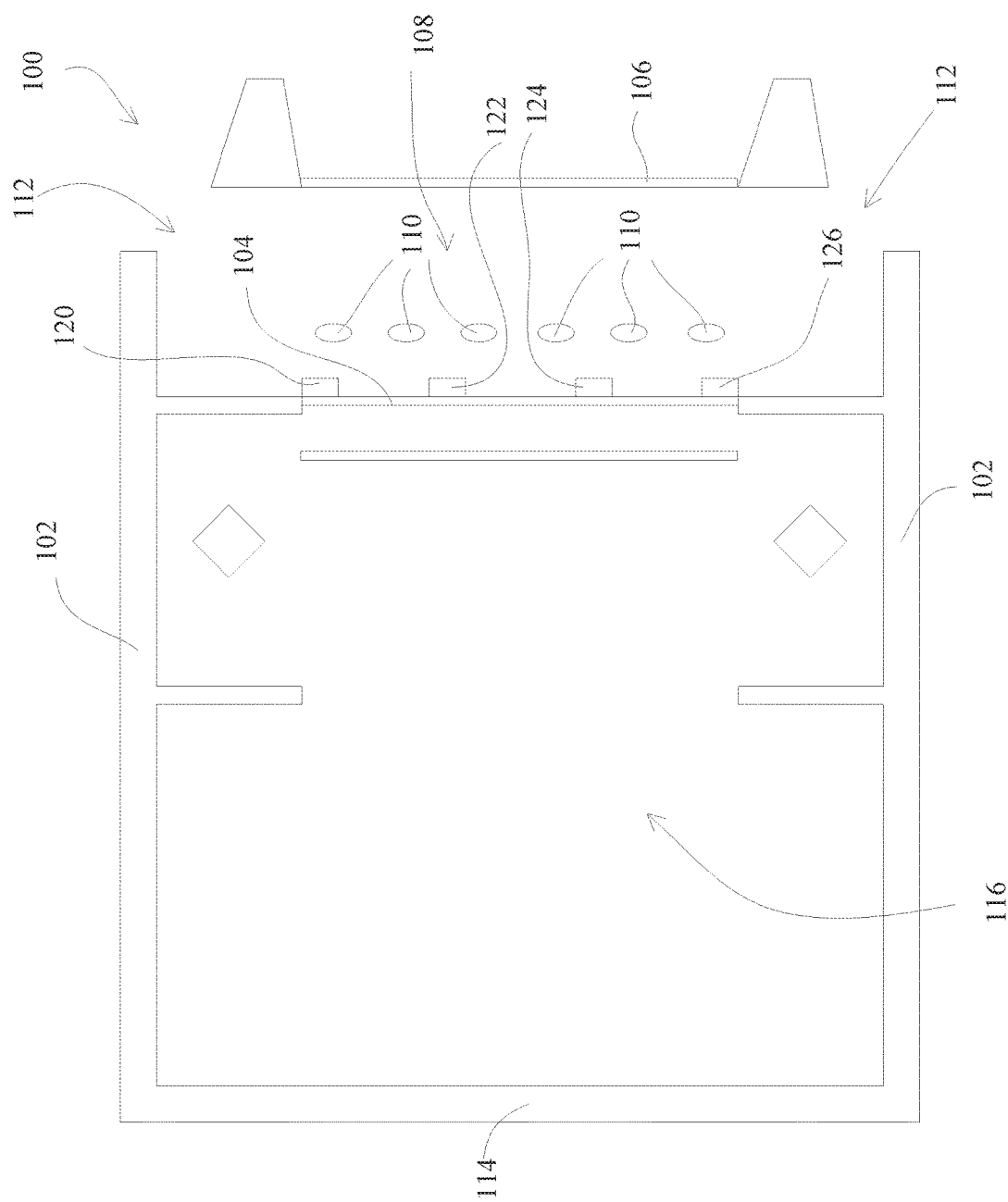
FIG. 1 is a map view of an arrangement for an interactive experience as described herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Generally, disclosed herein is a system for providing an interactive experience for multiple game-players. The experience may for example be provided in a light-controlled setting where the game-players may wear or hold one or more of various toys (such as gloves or other accessories that are worn, including headwear, accessories that are held, and so forth). The system detects and recognizes the toy(s) along with gestures and pointing efforts performed by the game-player and the system generates an effect based on the type of toy and the type of gesture. The system also generates one or more visual targets that are visible to the game-player such as projections, holograms, and displays (or other) of one or more of various fantasy virtual adversaries. The generated effects may include any combination of sensory effects including visual, audio, tactile, and smell/taste. The generated effect may be directed based on the pointing efforts of the game-player. The system may then register the effect on the target, if the pointing efforts intersect with the virtual location of the target.

There are many possible variations on this arrangement. The toy may be detected and recognized by the system via optical sensing techniques, via RFID, or via other techniques. The system may include a front barrier to restrict game-players from entering into the theatrical zone where the targets appear. The system may include a rear barrier to define the game-player zone and restrict a large number of non-game-players from crowding closely behind the game-players and/or to restrict the number of game-players. The system may include a variety of light sources, sound generators and speakers, and various devices for causing target images to appear in the theatrical zone. In addition, the theatrical zone may contain a variety of set pieces such as may typically be used in theatrical settings. A variety of sensors may be used to sense the gestures and player input (e.g., pointing efforts) of the game-players. The same or a different set of sensors may be used to detect and recognize the toys associated with the system. The system may collect unique identifier information about each game-player so that scoring and other competitive aspects can be monitored and collected. A game-player's past results or score could provide for an enhanced or different effect to be generated as a result of the game-player's gestures. The system may display a simulated valuable or dangerous object somewhere in the zone and then may display that object as being possessed by the target, and vice versa. Further, none of these is a requirement. For example, the area in which the experience is provided may not be a light-controlled area.

Figure 2:
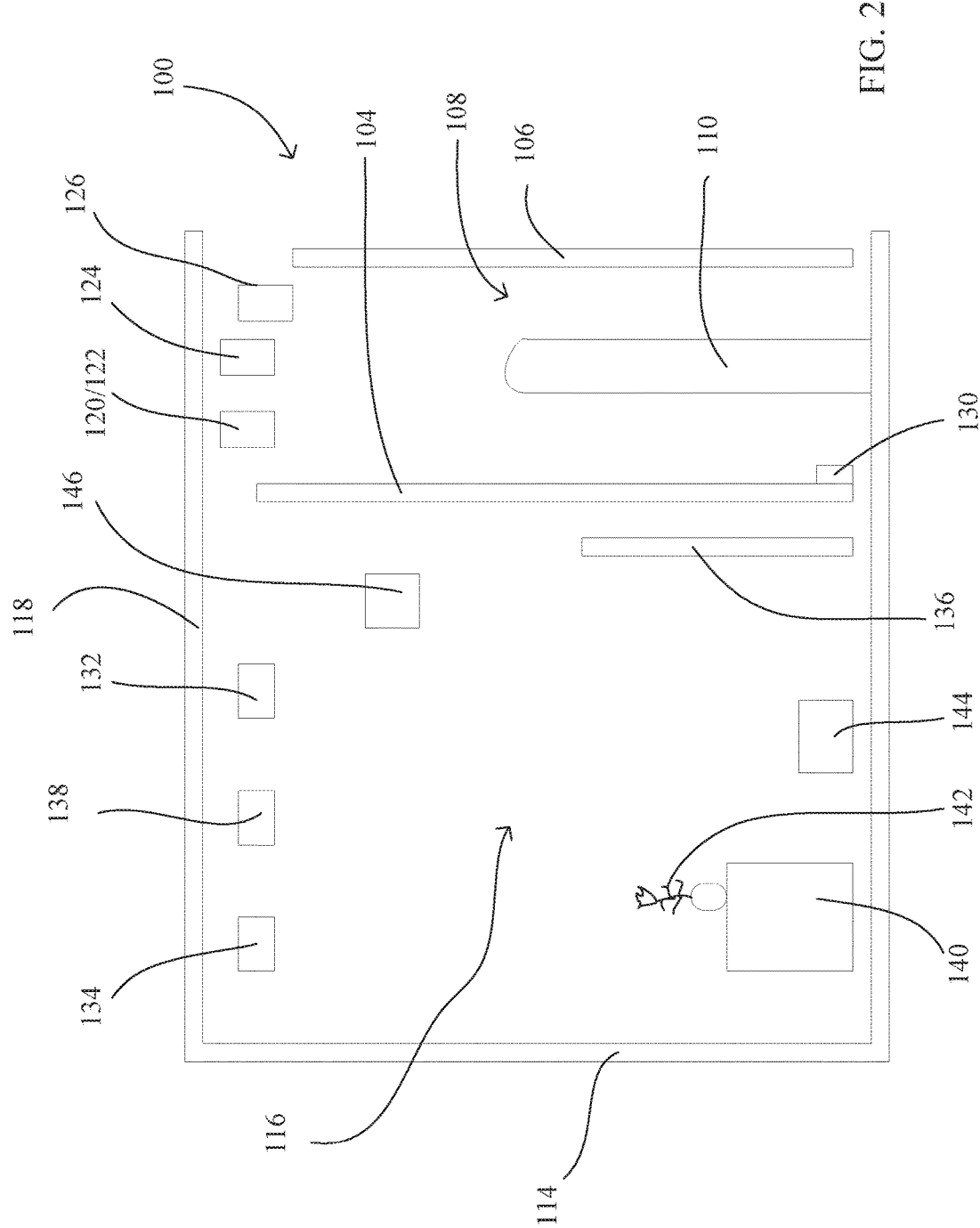
FIG. 2 is an elevation view of the interactive experience.

An exemplary system 100 for providing an interactive experience as described herein is shown in FIGS. 1 and 2, which show a map view and side sectional elevation view, respectively. The system 100 includes side walls 102 that, together with front window 104 and rear barrier 106, define a game-player zone 108 in which six game-players 110 are located. Gaps 112 between the side walls 102 and the rear barrier 106 define ingress and egress paths to and from the game-player zone 108.

The side walls 102 extend back to back wall 114, which together with the front window 104 define the theatrical zone 116 in which a variety of images can be made to appear, sounds generated therefrom, and various other lighting and special effects can be produced. A top wall 118 may also be provided to extend between the side walls 102 and between the back wall 114 and the front window 104 and rear barrier 106 as may be desirable to provide a more controlled environment for light, sound, weather, and so forth.

A variety of sensors, sound-producing devices, image-producing devices, light-producing devices, and other special effects devices, may be provided in the theatrical zone 116 and/or in the game-player zone 108. For example, the game-player zone 108 may include one or more RFID readers 120, one or more optical cameras 122 for recognizing toys worn or carried by a game-player, one or more movable directional speakers 124, one or more LIDAR sensors 126, and other associated equipment (all of which is generically represented by 130 in FIG. 2). Actually, one or more (or all) of these various devices could be provided outside of the game-player zone 108 but nearby and directed toward the game-player zone 108. Alternatively, one or more (or all) of these various devices could be within the game-player zone 108 but placed so that the game-players cannot touch or damage the devices. For example, they could be placed in an elevated position above the game-players or they could be placed within appropriate and suitable protective enclosures.

The theatrical zone 116 may include one or more projectors 132, one or more displays (OLED or other type) 134, one or more screens 136, one or more lighting sources 138, a variety of set pieces 140, animated objects/props 142, one or more speakers 144, one or more cameras 146, one or more sheets of glass (such as may be used for Pepper's Ghost illusions), half-silvered mirrors, and other associated equipment.

Figure 3:
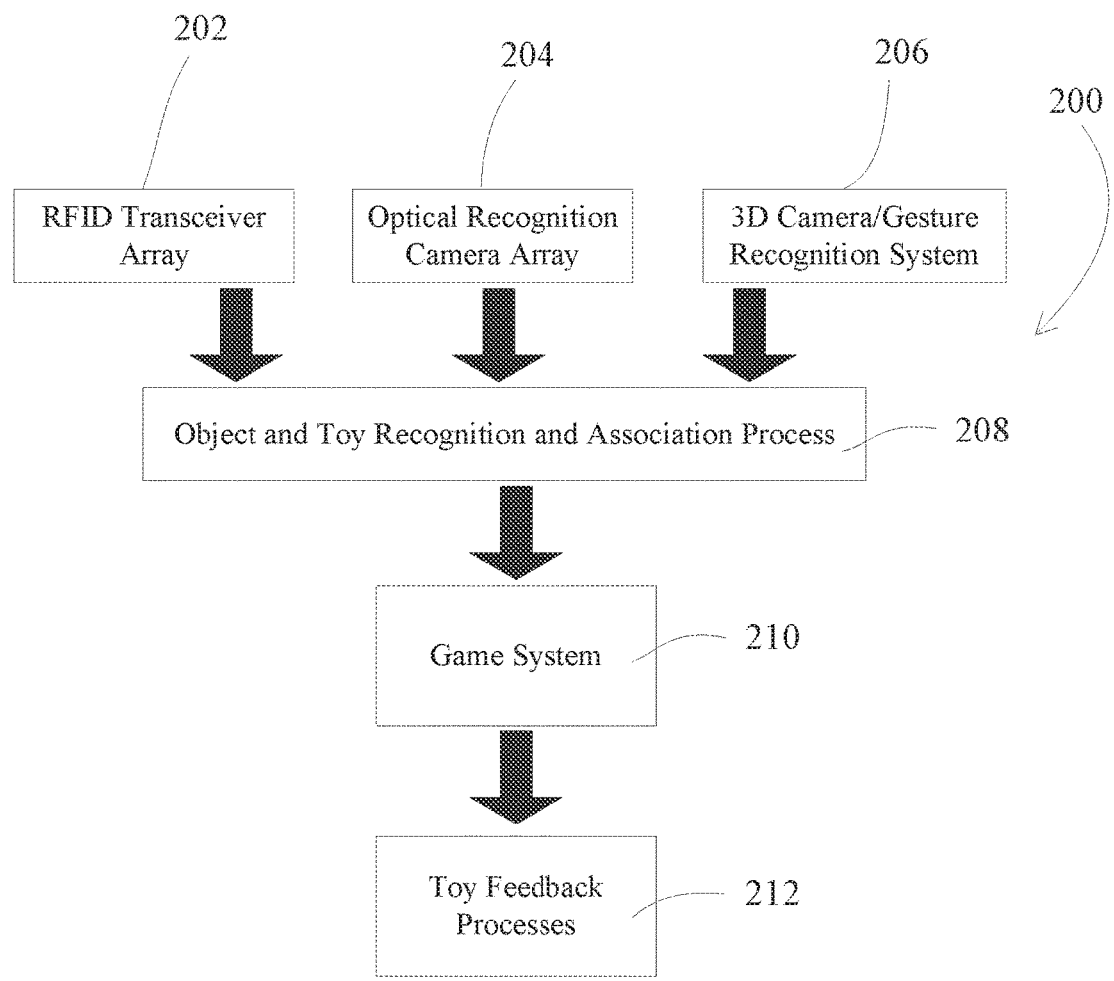
FIG. 3 is a block diagram of portions of components of the interactive experience.

A toy recognition system 200, shown in FIG. 3, may include an RFID transceiver array 202, an optical recognition camera array 204, and a 3D camera/gesture recognition system 206, all of which provide inputs to a an object and toy recognition and association process 208 which may be implemented in one or more computers. The data from either or both of the RFID transceiver array 202 and optical recognition camera array 204 is used in the identification of the presence of, location of, and type of toys associated with each game-player. The data from the 3D camera/gesture recognition system 206 is used to help recognize the gestures performed by each game-player, to see if they are triggering gestures. The object and toy recognition and association process 208 serves to takes the data from either or both of the RFID transceiver array 202 and optical recognition camera array 204 and from the 3D camera/gesture recognition system 206 and identify the presence of and type of toys associated with each game-player and recognize the gestures performed by each game-player. The RFID technology could be passive or active.

The toy recognition system 200 may provide information from the object and toy recognition and association process 208 to a game system 210 that operates the interactive experience by displaying the visual targets, moving the visual targets, displaying the effects generated by the game-player, showing the interaction of the effects and the visual targets, and so forth. The game system 210 may provide one or more inputs to a toy feedback process 212 that serves to provide various types of feedback to the game-player.

For instance, if a guest is playing with a particular type of glove, the glove can receive messages through an IR receiver on the palm. The system can detect the glove and decide if it is used by a particular game-player. Further, the game-player may make a predefined gesture. The game system then calculates the angle and origin of the game-player's pointing efforts (e.g., a shot) and plays the appropriate animation in the media. The game system knows that the glove can receive IR messages, so it causes the installation to send the glove a signal which causes the glove to light up, vibrate, and play an associated sound effect.

More specifically, the system knows the distance between the player area and the target plane. Further, through the gesture recognition system, it knows the exact location of the player. The aiming system of the game uses this data to calculate the distance of the player to the plane, as well as the player's positional relationship to the center of the aiming plane. When a player "shoots," the collision system calculates the aiming angle of the player from the calculated position of the player in a virtual representation of the installation. The system then projects a ray from the virtual player through the target plane. If this ray intersects with an interactable object, the game system can react to the collision.

As can be seen, this system senses the three-dimensional position of the game-player from a location nearer to the game-player than the target plane (projection surface). By positioning the three-dimensional sensor closer to the game-player than projection surface, the accuracy of the three-dimensional position can be enhanced. Since the system knows the three-dimensional position of the sensor to the projection surface, the ray or vector from the game-player to the projection surface can be determined. Systems that used a Kinect or the like have the distance sensor at essentially the same plane as the projection surface.

A specific, non-limiting example of an interactive experience will now be described. Consider a fictional character that has various "magic powers." And consider that the character commonly wears a particular type/color of gloves. Further, consider that the character often makes a particular gesture when they use their magic powers. For example, this particular character extends their arms in front of them and points all their fingers at a target when they want use their magic powers to "freeze" the target. And freezing the target means that the target is surrounded in ice and becomes immobilized. And a variety of one or more virtual adversaries that may or may not be commonly associated with this fictional character can be portrayed as the targets.

In the interactive experience disclosed herein, the object and toy recognition system could be configured to recognize that a particular game-player is wearing that type/color of gloves. And the gesture recognition system could be configured to recognize the above-described gesture. And the pointing direction determining system could be configured to determine the vector along which the game-player is pointing. The system could generate an image of a stream of ice particles along the pointing direction from the game-player. The system could further determine if the pointing direction (vector) intersects with (or comes within some predetermined distance of) one of the visual targets. If so, the displayed image of the target could be changed to show the result of the "freezing" magic powers being directed at the target—example, the virtual adversary could be shown as encased in ice and immobilized.

Figure 7:
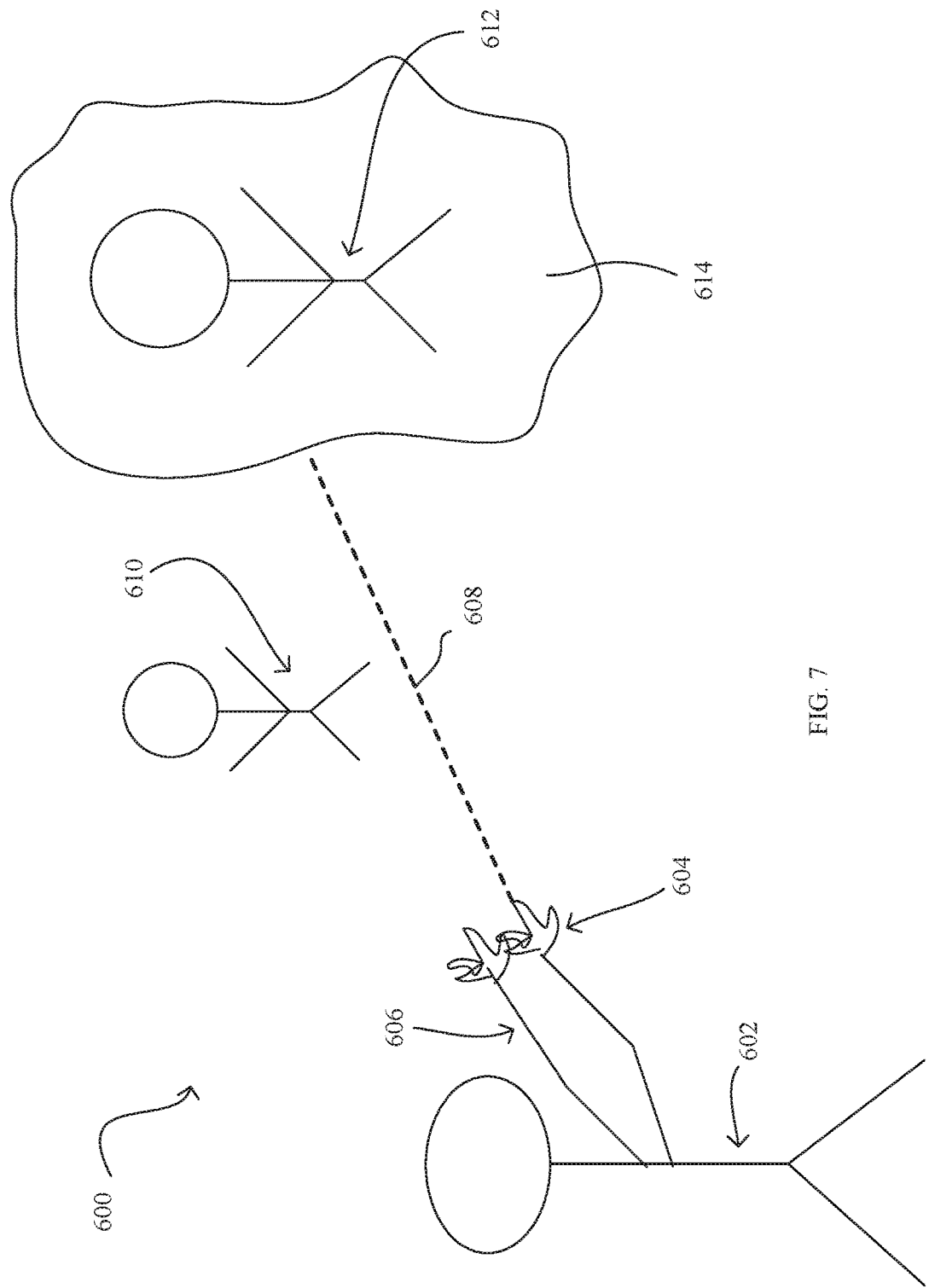
FIG. 7 is an illustration of a game-player interacting with a pair of targets in the interactive experience.

FIG. 7 shows such a scenario 600 as described. A game-player 602 is wearing a specific pair of gloves 604 that are associated with the "freezing" magic powers. When the game-player 602 makes a predefined gesture 606 (in this example, pointing all their fingers at a target), a stream 608 of ice particles is shown (displayed) to be directed along the pointing direction of the game-player 602. Two targets 610 and 612 are displayed in virtual positions. Since the stream 608 of ice particles is directed at the target 612, the virtual image of the target 612 is changed to be encased in ice 614.

It should be understood that there may be multiple players directing effects to the same target. Further, each toy (character) may have multiple different magic powers that can be directed toward the target, depending on which gesture the game-player uses. Still further, feedback may be provided back to the game-player that the effect is being produced (stream of ice particles), In addition to visual feedback of the effect, the feedback may include tactile feedback (e.g., vibration of the toy or vibration of the floor), visual feedback based on light produced on the toy, audio feedback produced by the toy or speakers in the game-playing zone, or olfactory feedback produced by the toy or other smell-generating device in the game-playing zone.

Figure 4:
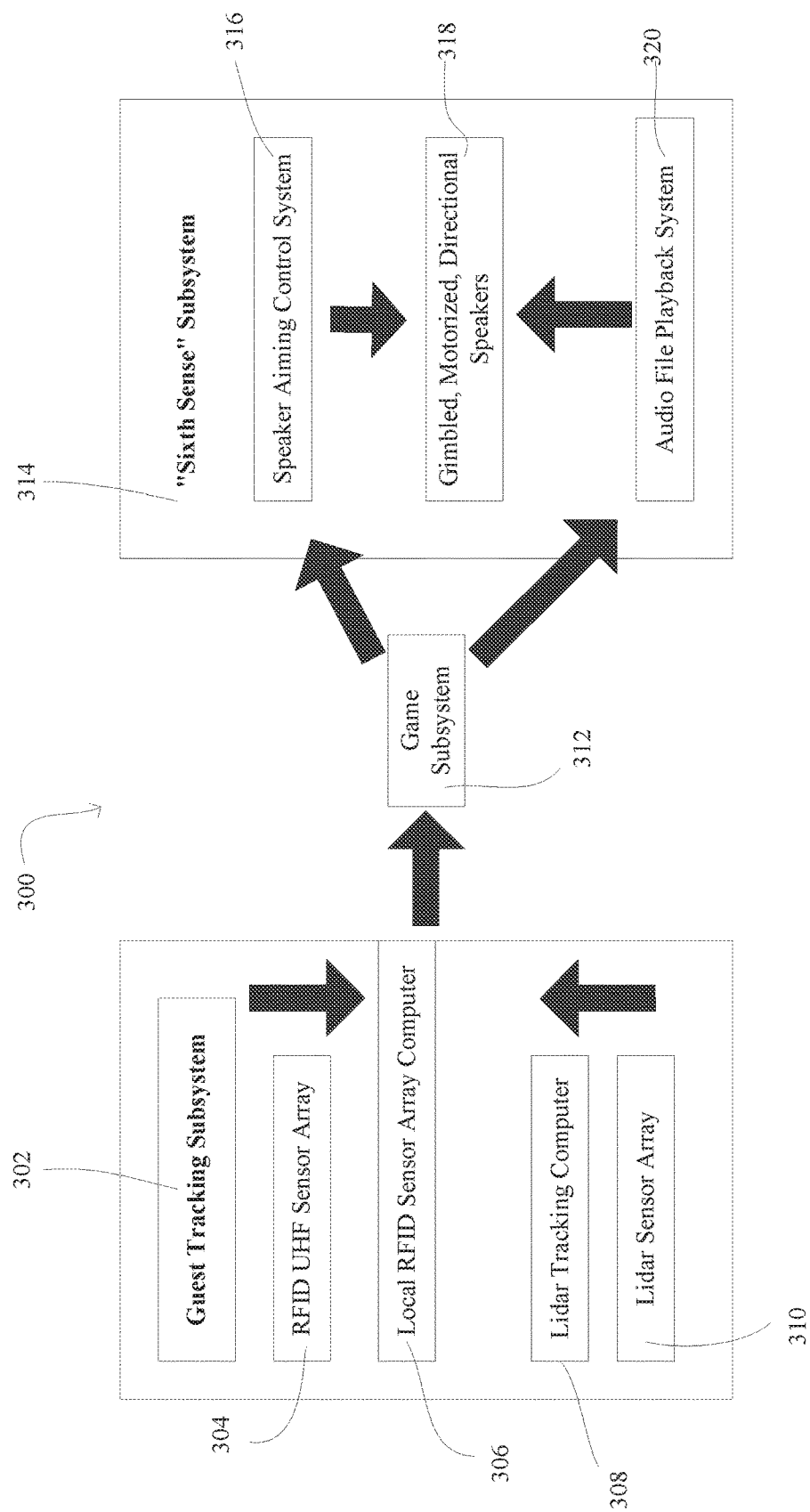
FIG. 4 is another block diagram of portions of components of the interactive experience.

FIG. 4 shows a system 300 with a guest tracking subsystem 302 that can be used to advertise to and invite potential players in the nearby vicinity to join the experience. The subsystem 302 may include an RFID sensor array 304 that provides signals to a local RFID sensor array computer 306. A LIDAR sensor array 310 provides signals to a LIDAR tracking computer 308, which takes data from the LIDAR sensor array 310 and recognizes nearby guests that could potentially become game-players. Data from the computers 306 and 308 are provided to a game subsystem 312. The game subsystem 312 sends data to (in order to control) a "sixth sense" subsystem 314. The sixth sense subsystem 314 can be used to give a potential game-player in the vicinity an indication that there may be virtual adversaries nearby that they could help to fight, control, or attack. The subsystem 314 may include a speaker aiming control system 316 that provides control signals/data to a gimbaled, motorized, directional speaker(s) 318 that receive audio information from audio file playback system 320. The speaker(s) 318 can be pointed directly at a potential game-player and a sound can be made to help alert the potential game-player to the presence of virtual adversaries nearby. Alternatively, instead of motorized speakers, the sound could be directed in a particular direction by having multiple directional speakers pointed in different directions, and a particular speaker could be selected.

Figure 5:
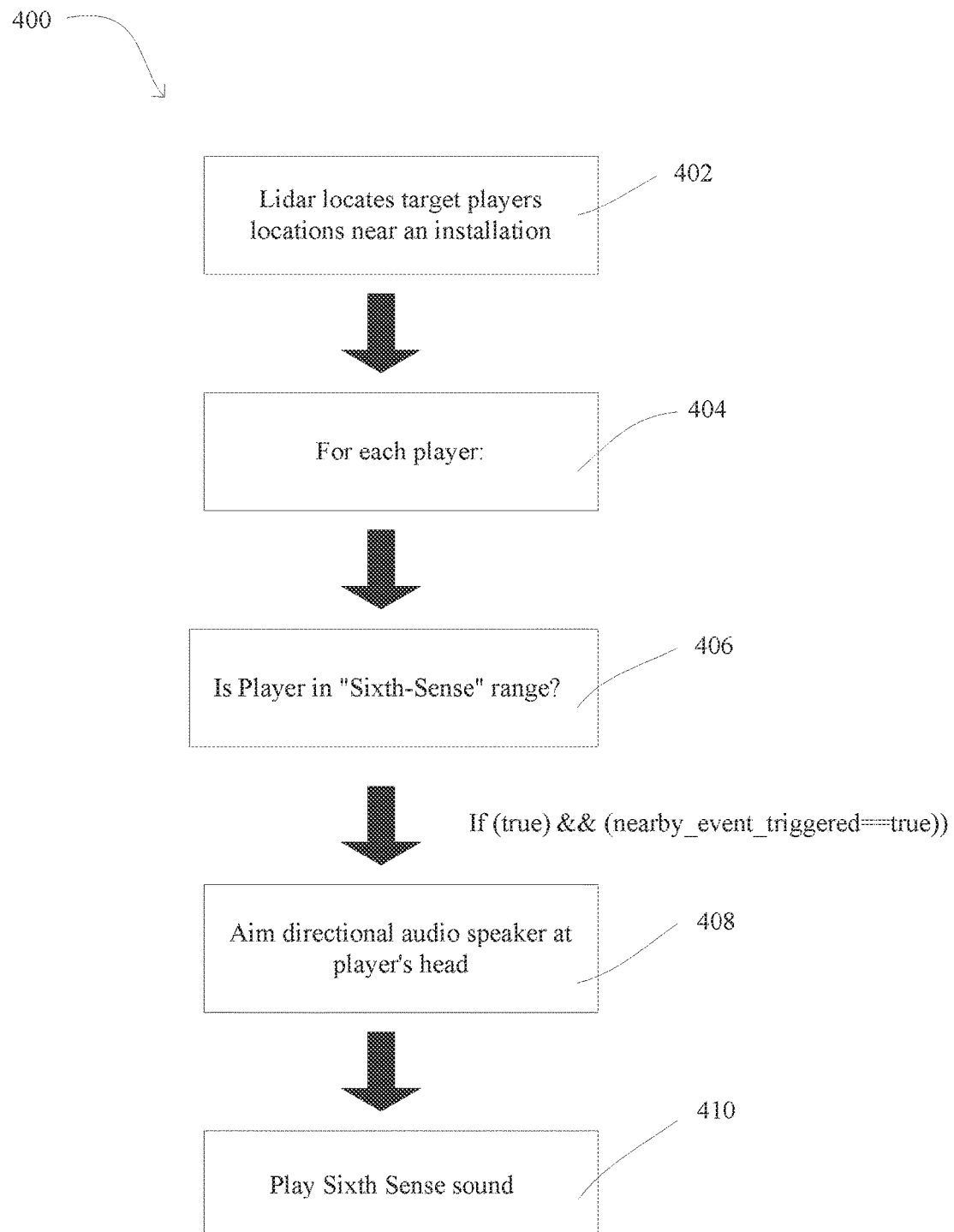
FIG. 5 is a flowchart of portions of the interactive experience.

FIG. 5 shows a flow 400 related to the arrangement 300 shown in FIG. 4. A LIDAR-based subsystem locates (302) target or potential game-players at locations near an interactive experience. And then, for each potential game-player (404) the following three operations are performed. A determination is made (406) if the game-player is in sixth sense range. If so, a directional audio speaker is directed (408) toward the game-player's head. Then, the sixth sense sound is played (410).

Figure 6:
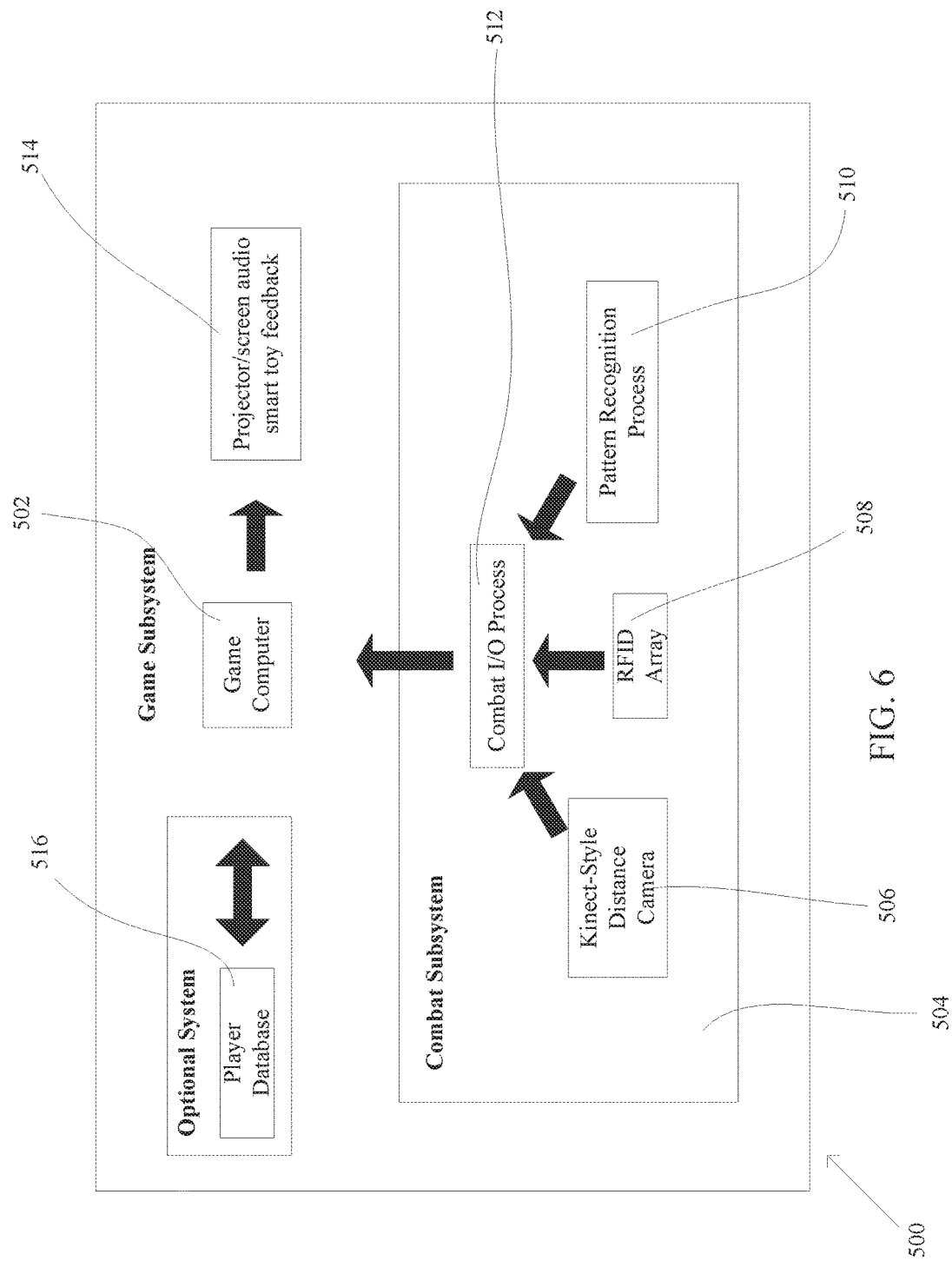
FIG. 6 is still another block diagram of portions of components of the interactive experience.

FIG. 6 shows further details about a game subsystem 500. The subsystem 500 includes a game computer 502 and a combat subsystem 504. The combat subsystem 504 includes a camera 506 (which may be a Kinect camera (or similar), which supplies image and depth information), and RFID array 508, and a pattern recognition process 510. Each of the camera 506, array 508, and process 510 provide data and/or signals to a combat I/O process 512 which provides data to the game computer 502. The game computer may then provide data/signals to a controller 514 that may control such varied items as a projector, display, speakers, lighting, animation, other special effects, and the previously-described feedback to a toy. Instead of (or in addition to) the camera, a LIDAR system could be used, where a LIDAR sensor senses the meshes of game-players and provides that information to the gesture tracking system.

Figure 8:
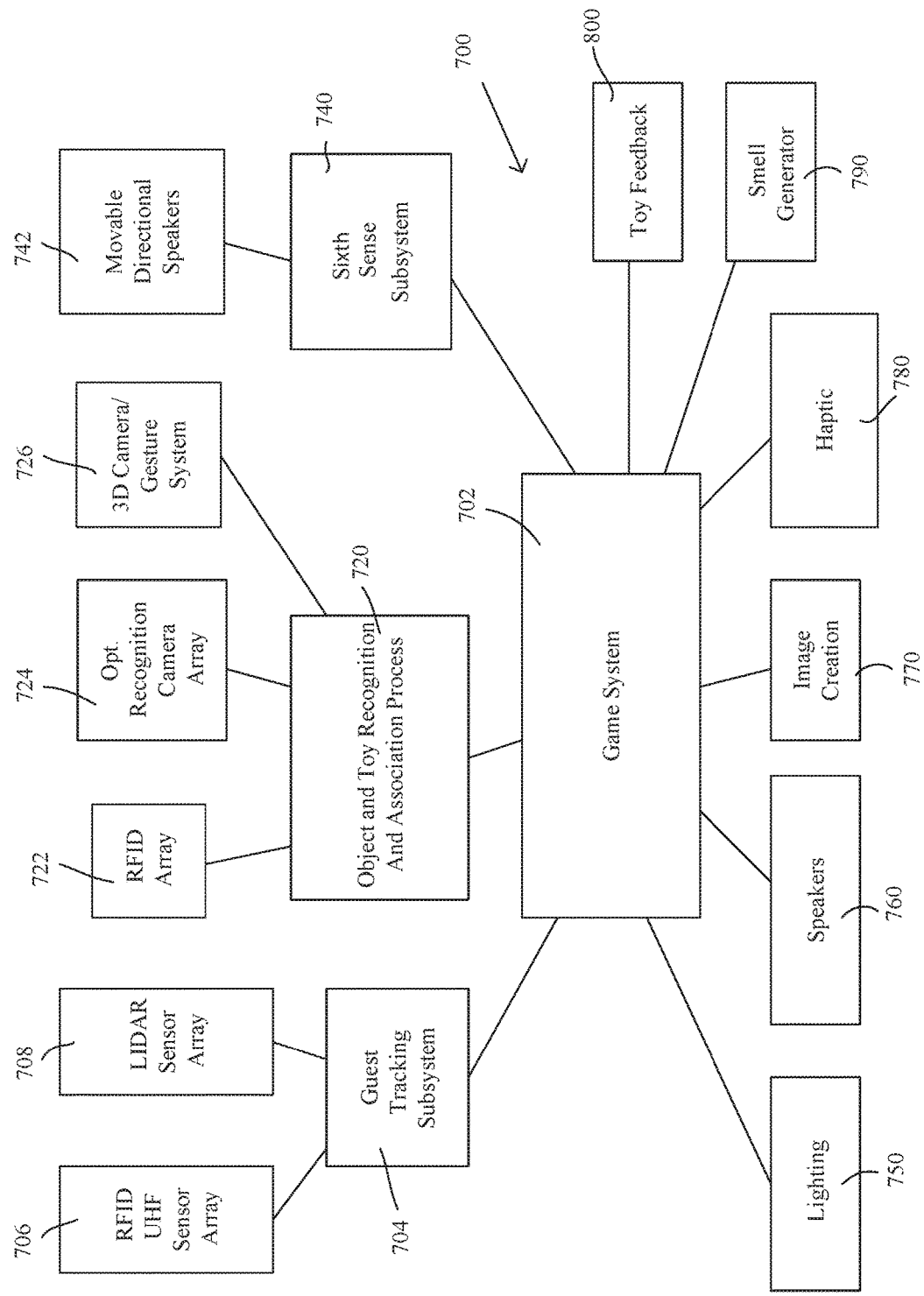
FIG. 8 is a block diagram of a system described herein.

FIG. 8 shows a block diagram of a system 700 as described herein. It includes a game system 702 that interacts with a guest tracking subsystem 704 that utilizes an RFID UHF sensor array 706 and a LIDAR sensor array 708. The game system 702 also interacts with an object and toy recognition and association process subsystem 720 that utilizes an RFID array 722, an optical recognition camera array 724, and a 3D camera/gesture system 726. The game system 702 also interacts with a sixth sense subsystem 740 that utilizes movable directional speakers 742. The game subsystem further interacts with a lighting subsystem 750, a speaker subsystem 760, an image creation subsystem 770, a haptic subsystem 780, a smell generating subsystem 790, and a toy feedback subsystem 800.

Figure 9:
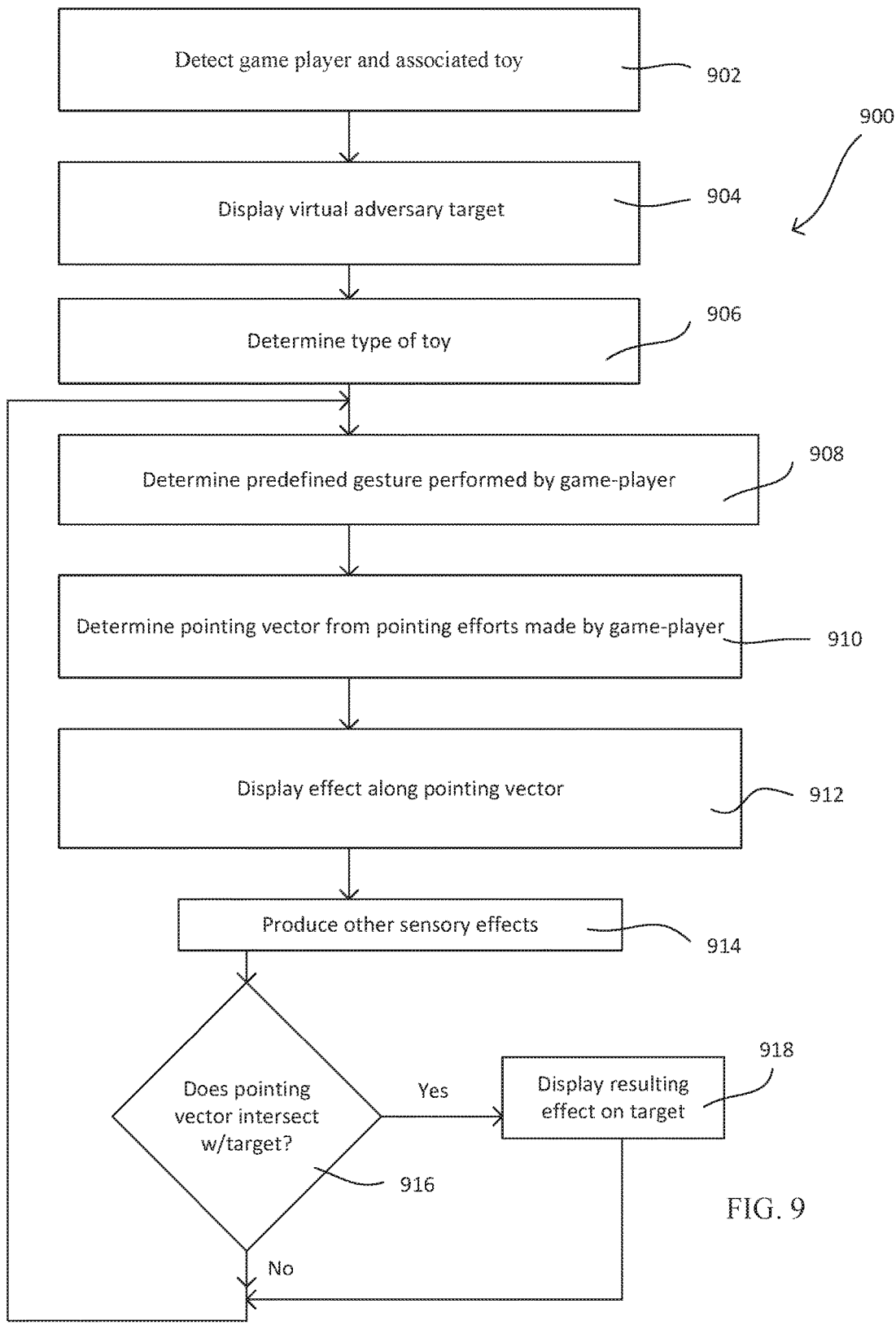
FIG. 9 is a flowchart of techniques described herein.

FIG. 9 shows a process 900 that is followed by the system described herein. It should be understood that although a particular order has been shown for the various operations in the process, an operation of subset of operations could be performed at a different time in the process. Thus, this flowchart and this accompanying description are not intended to be limiting as to the particular order in which operations are performed. Further, the process could also be performed with any one or ones of the operations omitted or with additional operations inserted therein.

A game-player and associated toy are detected (902). A virtual adversary target is displayed (904). The type of toy is determined (906). The predefined gesture performed by the game-player is determined (908). The pointing vector created by pointing efforts of the game-player is determined (910). A visual effect is displayed (912) along the pointing vector, the effect being correlated to the toy type and the predefined gesture. Other sensory effects (sound, haptic, smell/taste) may be produced (914). It is determined (916) if the pointing vector intersects with the target. If not, the missed "shot" can be visually displayed and associated effects (animations and sounds) can also be used. The process flow returns to operation 908. On the other hand, if it does intersect, the resulting effect on the target is displayed (918).

In addition, the system could capture the game-state of a player by uniquely identifying the player (via RFID, barcode or other readable, numerically or string serialized system). This game-state could be maintained for each player in a connected database. Each toy could also have its own state stored in an onboard RFID chip, or non-volatile storage, where the state is provided by wireless RFID, IR, or other delivery techniques sending messages to the toy from the game system.

Further, the system can sense that a plurality of toys/apparel are being worn by the same player. For instance, one player may have both a glove of power and a ray-gun. The player can use both toys simultaneously during the game.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

At this point, methods and techniques for performing such computer-implemented methods will be discussed. Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 10:
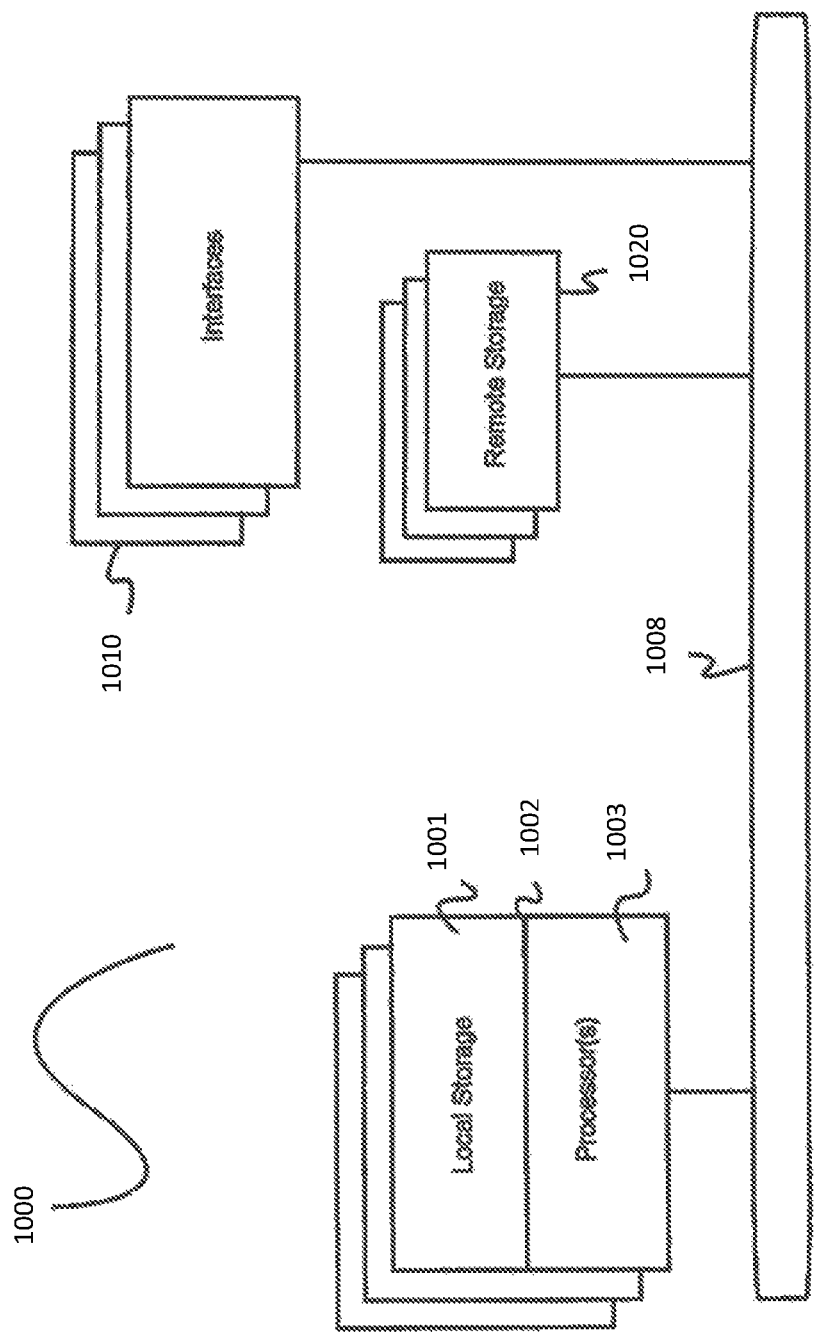
FIG. 10 is a block diagram illustrating an exemplary hardware architecture of a computing device used in an embodiment of the disclosure herein.

Referring now to FIG. 10, there is shown a block diagram depicting an exemplary computing device 1000 suitable for implementing at least a portion of the features or functionalities disclosed herein. Computing device 1000 may be, for example, any one of the computing machines listed in the previous paragraph, or indeed any other electronic device capable of executing software- or hardware-based instructions according to one or more programs stored in memory. Computing device 1000 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1000 includes one or more central processing units (CPU) 1002, one or more graphic processing units (GPU) (not shown), one or more interfaces 1010, and one or more busses 1006 (such as a peripheral component interconnect (PCI) bus). When acting under the control of appropriate software or firmware, CPU 1002 may be responsible for implementing specific functions associated with the functions of a specifically configured computing device or machine. For example, in at least one embodiment, a computing device 1000 may be configured or designed to function as a server system utilizing CPU 1002, local memory 1001 and/or remote memory 1020, and interface(s) 1010.

In at least one embodiment, CPU 1002 may be caused to perform one or more of the different types of functions and/or operations under the control of software modules or components, which for example, may include an operating system and any appropriate applications software, drivers, and the like. CPU 1002 may include one or more processors 1003 such as, for example, a processor from one of the Intel, ARM, Qualcomm, and AMD families of microprocessors. In some embodiments, processors 1003 may include specially designed hardware such as application-specific integrated circuits (ASICs), electrically erasable programmable read-only memories (EEPROMs), field-programmable gate arrays (FPGAs), and so forth, for controlling operations of computing device 1000. In a specific embodiment, a local memory 1001 (such as non-volatile random access memory (RAM) and/or read-only memory (ROM), including for example one or more levels of cached memory) may also form part of CPU 1002. However, there are many different ways in which memory may be coupled to system 1000. Memory 1001 may be used for a variety of purposes such as, for example, caching and/or storing data, programming instructions, and the like. Similarly, in at least one embodiment, multiple processing cores of GPU may be caused to perform sequences of different steps or functions in parallel (independently and concurrently) for different parts of the image or computation.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, a graphics processing unit, stream processing unit, and any other programmable circuit.

In one embodiment, interfaces 1010 are provided as network interface cards (NICs). Generally, NICs control the sending and receiving of data packets over a computer network; other types of interfaces 1010 may for example support other peripherals used with computing device 1000. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 1010 may include ports appropriate for communication with appropriate media. In some cases, they may also include an independent processor and, in some in stances, volatile and/or non-volatile memory (e.g., RAM).

Although the system shown in FIG. 10 illustrates one specific architecture for a computing device 100 for implementing one or more of the embodiments described herein, it is by no means the only device architecture on which at least a portion of the features and techniques described herein may be implemented. For example, architectures having one or any number of processors 1003 may be used, and such processors 1003 may be present in a single device or distributed among any number of devices. In one embodiment, a single processor 1003 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 1020 and local memory 1001) configured to store data, program instructions for the general-purpose network operations, or other information relating to the functionality of the embodiments described herein (or any combinations of the above). Program instructions may control execution of or comprise an operating system and/or one or more applications, for example. Memory 1020 or memories 1001, 1020 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
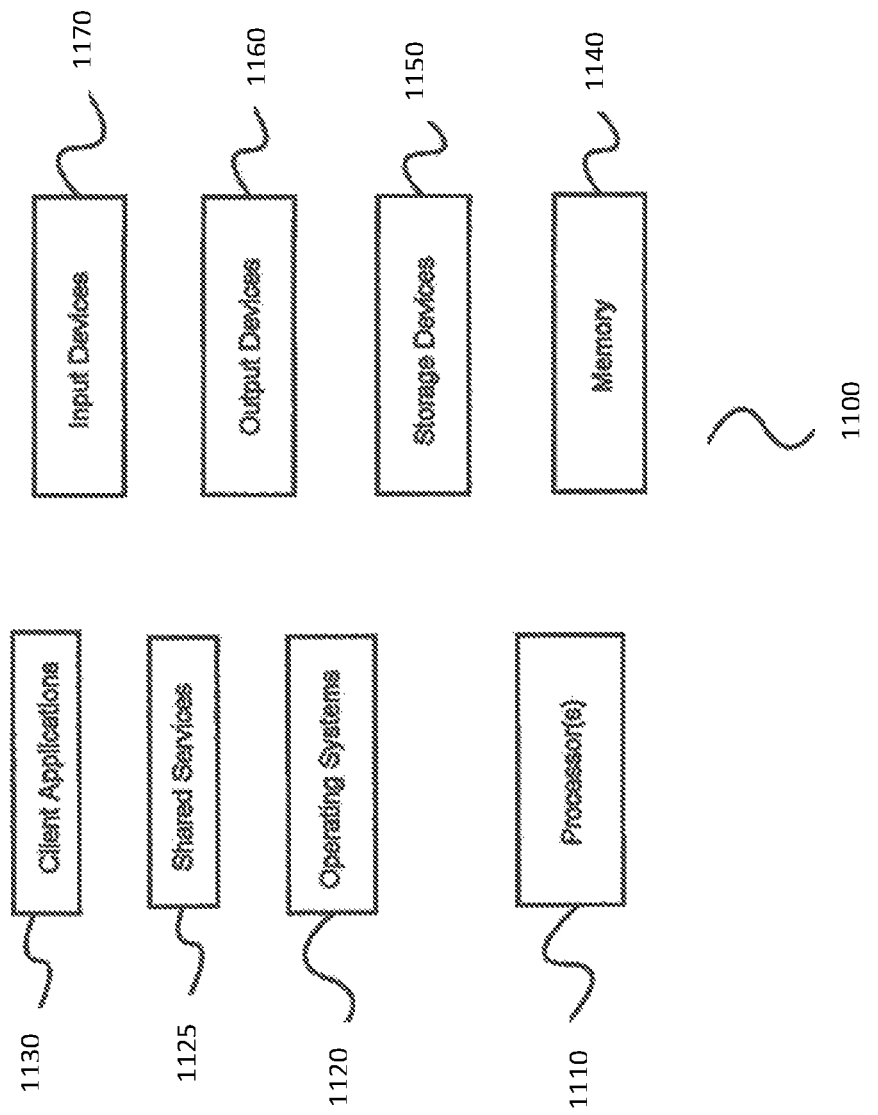
FIG. 11 is a block diagram illustrating an exemplary logical architecture for a client device, according to an embodiment of the disclosure herein.

In some embodiments, systems may be implemented on a standalone computing system. Referring now to FIG. 11, there is shown a block diagram depicting a typical exemplary architecture of one or more embodiments or components thereof on a standalone computing system. Computing device 1100 includes processors 1110 that may run software that carry out one or more functions or applications of embodiments, such as for example a client application 1130. Processors 1110 may carry out computing instructions under control of an operating system 1120 such as, for example, a version of Microsoft's Windows™ operating system, Apple's Mac OS/X or iOS operating systems, some variety of the Linux operating system, Google's Android™ operating system, or the like. In many cases, one or more shared services 1125 may be operable in system 1100, and may be useful for providing common services to client applications 1130. Services 1125 may for example be Windows™ services, user-space common services in a Linux environment, or any other type of common service architecture used with operating system 1110. Input devices 1170 may be of any type suitable for receiving user input, including for example a keyboard, touchscreen, microphone (for example, for voice input), mouse, touchpad, trackball, or any combination thereof. Output devices 1160 may be of any type suitable for providing output to one or more users, whether remote or local to system 1100, and may include for example one or more screens for visual output, speakers, printers, or any combination thereof. Memory 1140 may be random-access memory having any structure and architecture known in the art, for use by processors 1110, for example to run software. Storage devices 1150 may be any magnetic, optical, mechanical, memristor, or electrical storage device for storage of data in digital form. Examples of storage devices 1150 include flash memory, magnetic hard drive, CD-ROM, and/or the like.

Figure 12:
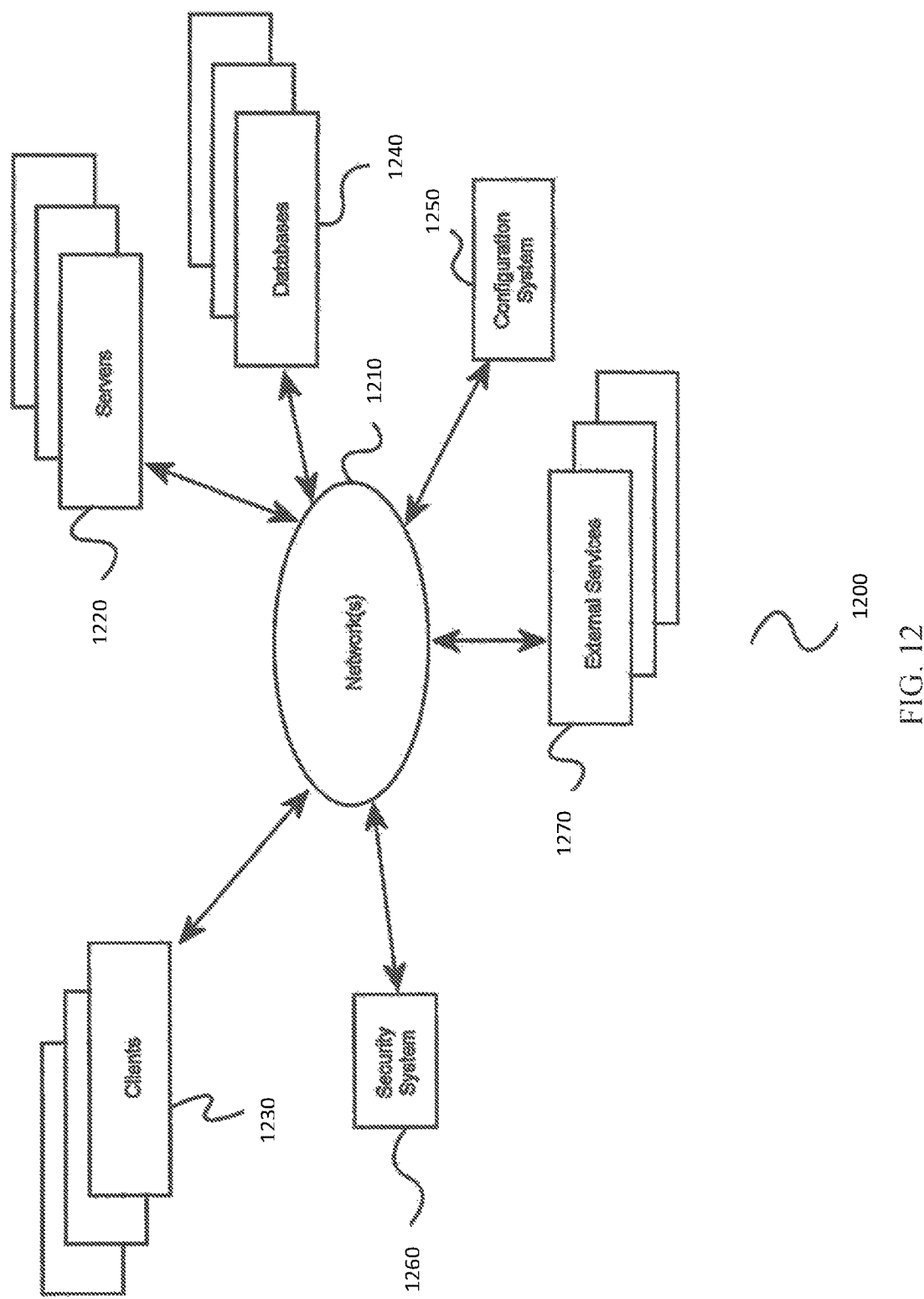
FIG. 12 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 12, there is shown a block diagram depicting an exemplary architecture for implementing at least a portion of a system according to an embodiment on a distributed computing network. According to the embodiment, any number of clients 1230 may be provided. Each client 1230 may run software for implementing client-side portions of the embodiments and clients may comprise a system 1100 such as that illustrated in FIG. 11. In addition, any number of servers 1220 may be provided for handling requests received from one or more clients 1230. Clients 1230 and servers 1220 may communicate with one another via one or more electronic networks 1212, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 1210 may be implemented using any known network protocols, including for example wired and/or wireless protocols.

In addition, in some embodiments, servers 1220 may call external services 1270 when needed to obtain additional information, or to refer to additional data concerning a particular call. Communications with external services 1270 may take place, for example, via one or more networks 1210. In various embodiments, external services 1270 may comprise web-enabled services or functionality related to or installed on the hardware device itself. For example, in an embodiment where client applications 1130 are implemented on a smartphone or other electronic device, client applications 930 may obtain information stored in a server system 1220 in the cloud or on an external service 1270 deployed on one or more of a particular enterprise's or user's premises.

In some embodiments, clients 1230 or servers 1220 (or both) may make use of one or more specialized services or appliances that may be deployed locally or remotely across one or more networks 1210. For example, one or more databases 1240 may be used or referred to by one or more embodiments. It should be understood by one having ordinary skill in the art that databases 1240 may be arranged in a wide variety of architectures and using a wide variety of data access and manipulation means. For example, in various embodiments one or more databases 1240 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 1260 and configuration systems 1250. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 1260 or configuration system 1250 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A system for providing an interactive game experience, comprising:
   a defined game-player zone in which one or more game-players may participate in the interactive game experience;
   a defined theatrical zone in which one or more images are produced, each image being produced at a real or virtual position; and
   one or more sensors positioned to:
      detect the presence of one or more predefined toys associated with each game-player,
      determine a toy type for each toy, wherein there are at least two different types of toys,
      recognize gestures made by each game-player, and
      determine the position and pointing direction of each game-player;
   wherein the system generates an effect from at least one of the game-players based on the toy type of the toy associated with that game-player and based on the gesture made by that game-player, wherein different toy types result in different effects being generated; and
   wherein the effect is directed along a direction determined by the position and pointing direction of that game player.

2. A system as defined in claim 1, further wherein the system determines if the direction the effect is directed along intersects with the real or virtual position of the image, and if so the image is changed to reflect the influence of the effect thereon.

3. A system as defined in claim 2, further including one or more sensors to uniquely identify each game-player so that historical data can be maintained on each game-player and the effect generated by that game-player can be enhanced based on the historical data.

4. A system as defined in claim 1, further including one or more sensors to uniquely identify each game-player so that historical data can be maintained on each game-player and the effect generated by that game-player can be enhanced based on the historical data.

5. A system as defined in claim 1, wherein one of the predefined toys include one or more gloves.

6. A system as defined in claim 1, wherein the one or more sensors include a different type of sensor for each of:

detecting the presence of the toys associated with each game-player and determining the toy type for each toy;

recognizing gestures made by each game-player; and determining the position and pointing direction of each game-player.

7. A system as defined in claim 1, wherein the sensor that detects the presence of the toys associated with each game-player and determines the toy type for each toy includes RFID technology.

8. A system as defined in claim 1, wherein the sensor that determines the position and pointing direction of each game-player includes LIDAR technology.

9. A system as defined in claim 1, further including one or more sensors to uniquely identify each game-player so that historical data can be maintained on each game-player.

10. A system for providing an interactive game experience, comprising:

a defined game-player zone in which one or more game-players may participate in the interactive game experience;

a defined theatrical zone in which one or more images are produced, each image being produced at a real or virtual position; and one or more sensors positioned to:

detect the presence of one or more predefined toys associated with each game-player, determine a toy type for each toy, recognize gestures made by each game-player, determine the position and pointing direction of each game-player, and uniquely identify each game-player so that historical data can be maintained on each game-player;

wherein the system generates an effect from at least one of the game-players based on the toy type of the toy associated with that game-player and based on the gesture made by that game-player; and wherein the effect is directed along a direction determined by the position and pointing direction of that game player.

\* \* \* \* \*